(12) United States Patent (10) Patent No.: US 8,643,897 B2
Koyama et al. (45) Date of Patent: Feb. 4, 2014

(54) IMAGE PROCESSING DEVICE, IMAGE PROCESSING METHOD, AND IMAGE PROCESSING PROGRAM

(75) Inventors: Minoru Koyama, Nagano (JP); Toru Fujita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 227 days.

(21) Appl. No.: 13/334,204

(22) Filed: Dec. 22, 2011

(65) Prior Publication Data

US 2012/0176633 A1 Jul. 12, 2012

(30) Foreign Application Priority Data

Jan. 6, 2011 (JP) ................................. 2011-000984

(51) Int. Cl.
*H04N 1/60* (2006.01)
*G03F 3/08* (2006.01)
*G06K 9/00* (2006.01)

(52) U.S. Cl.
USPC ............. 358/1.9; 358/518; 358/520; 382/167

(58) Field of Classification Search
USPC .......... 358/1.9, 530, 539, 533, 538, 540, 520, 358/504, 521; 382/167, 162
See application file for complete search history.

(56) References Cited

U.S. PATENT DOCUMENTS

| | | | |
|---|---|---|---|
| 5,748,199 A * | 5/1998 | Palm ............................. | 345/473 |
| 5,774,124 A | 6/1998 | Itoh et al. | |
| 5,923,777 A | 7/1999 | Chun et al. | |
| 6,124,857 A | 9/2000 | Itoh et al. | |
| 6,271,856 B1 * | 8/2001 | Krishnamurthy .............. | 345/581 |
| 8,049,193 B1 * | 11/2011 | Appleby et al. ........... | 250/505.1 |
| 8,429,174 B2 * | 4/2013 | Ramani et al. ................. | 707/749 |
| 2005/0168460 A1 * | 8/2005 | Razdan et al. ................ | 345/419 |
| 2008/0165423 A1 * | 7/2008 | Steenblik et al. ............. | 359/626 |

FOREIGN PATENT DOCUMENTS

| | | |
|---|---|---|
| JP | 08-138082 A | 5/1996 |
| JP | 09-245190 A | 9/1997 |
| JP | 10-051652 A | 2/1998 |
| JP | 11-119409 A | 4/1999 |
| JP | 2000-076486 A | 3/2000 |
| JP | 2005-199625 A | 7/2005 |

* cited by examiner

*Primary Examiner* — Madelein A Nguyen

(74) *Attorney, Agent, or Firm* — Global IP Counselors, LLP

(57) ABSTRACT

A plurality of grid points for forming a quadrangle is quasi-formed on a medium prior to deformation, after which position information is acquired that relates to the positions of the grid points moved in conjunction with deformation of the medium. The area difference of two triangles divided by a first diagonal is computed in a quadrangle formed by the grid points after deformation of the medium, and the area difference of two triangles divided by a second diagonal different from the first diagonal is computed in the quadrangle. The quadrangle quasi-formed on the medium prior to deformation is divided using one of the first and second diagonals that yields the larger area difference, and the formation amount of colorant formed on the medium is corrected according to the deformation ratio after deformation for the triangles formed by the division.

12 Claims, 5 Drawing Sheets

△ABD≪△BCD    △ABC≒△ACD

IMAGE PROCESSING DEVICE, IMAGE PROCESSING METHOD, AND IMAGE PROCESSING PROGRAM

CROSS-REFERENCE TO RELATED APPLICATIONS

This application claims priority to Japanese Patent Application No. 2011-000984 filed on Jan. 6, 2011. The entire disclosure of Japanese Patent Application No. 2011-000984 is hereby incorporated herein by reference.

BACKGROUND

1. Technical Field

The present invention relates to an image processing device, and to an image processing method and program for the same, and more specifically relates to an image processing device for processing an image formed by a colorant on a medium that is deformed by molding, and to an image processing method and program for the same.

2. Related Art

As an example of this type of image processing device, a device has been proposed for fabricating a block copy and printing the block copy, the block copy having a design required by a designer in a case in which a printed test block copy having a grid formed thereon is molded into a finished three-dimensional object which is digitized together with the original block copy into a computer to comprehend such characteristics as the properties of printing with respect to the three-dimensional object or the deformation condition of the method for fabrication into a three-dimensional object, and a three-dimensional object is molded (refer to Japanese Laid-Open Patent Publication No. 11-119409, for example). A technique has also been proposed for computing the distortion of the picture of a picture film before and after molding thereof and recording the result as a mapping function, fabricating a printed picture that is deformed based on the mapping function so as to cancel out the distortion of the picture, recording the film density variation before and after molding as a density variation function, and correcting the density of the printed picture based on the density variation function (refer to Japanese Laid-Open Patent Publication No. 2005-199625, for example).

SUMMARY

However, in the device of Japanese Laid-Open Patent Publication No. 11-119409, although the shape after molding is considered, color density is not considered. In the device of Japanese Laid-Open Patent Publication No. 2005-199625, the density variation of the picture is corrected by a film density variation, but color correction is inadequate in the case that the corrected units are basic grid units, and in the case that the corrected units are color dot units, the processing is complex.

The present invention was developed in view of such problems, and an object of the present invention is to provide an image processing device capable of more appropriately performing color correction by simpler processing in a medium that is deformed after an image is formed thereon, and to provide an image processing method and program for the same.

The present invention employs the means described below to achieve the objects of the present invention.

An image processing device according to a first aspect of the present invention is a device for processing an image formed using a colorant on a medium that is deformed by molding. The image processing device includes a position information acquisition part, an area difference computation part, a dividing part, and a correction execution part. The position information acquisition part is configured to acquire position information relating to positions of a plurality of grid points. The grid points are quasi-formed on the medium to form a first quadrangle prior to deformation and subsequently moved in conjunction with deformation of the medium. The area difference computation part is configured to compute a first area difference which is an area difference of two triangles obtained by dividing a second quadrangle by a first diagonal, the second quadrangle being formed by the grid points after deformation of the medium, and to compute a second area difference which is an area difference of two triangles obtained by dividing the second quadrangle by a second diagonal different from the first diagonal. The dividing part is configured to divide the first quadrangle quasi-formed on the medium prior to deformation by using one of the first diagonal and the second diagonal that yields a larger area difference when the first area difference and the second area difference are compared. The correction execution part is configured to correct a formation amount of colorant formed in a region of each of the triangles of the medium according to a deformation ratio after deformation for each of the triangles formed by dividing the first quadrangle.

In this image processing device, a plurality of grid points for forming a quadrangle is quasi-formed on a medium prior to deformation, after which position information is acquired that relates to the positions of the plurality of grid points moved in conjunction with deformation of the medium, the area difference of two triangles divided by a first diagonal is computed in a quadrangle formed by the grid points after deformation of the medium, and the area difference of two triangles divided by a second diagonal different from the first diagonal is computed in the quadrangle. The quadrangle quasi-formed on the medium prior to deformation is divided using the diagonal that yields the larger area difference among the first diagonal and the second diagonal, and the formation amount of colorant formed on the medium is corrected according to the deformation ratio after deformation for the triangles formed by the division. The grid points in the quadrangle formed by the grid points of the medium after deformation are in a three-dimensional positional relationship, and regions having different deformation ratios are sometimes included in the region of the quadrangle. Here, two diagonals are used to divide the quadrangle into two regions having different deformation ratios after deformation of the medium, a diagonal which produces a large area difference, i.e., a large difference in the deformation ratio, is used to divide the quadrangle, and the formation amount of colorant is corrected for each divided region. Consequently, by using triangular regions formed by diagonals, color correction can be more appropriately performed by simpler processing. The expression "quasi-formed on the medium" refers to pseudo-formation on the medium, and may beam forming a grid-point image on an image on the medium or forming (e.g., printing, affixing, or otherwise forming) grid points on a prototype medium. The term "positional relationship" may be interpreted to mean coordinate values of grid points, for example. An area difference may be computed by subtracting the smaller area value from the larger area value of two area values, or by taking the absolute value of the difference of two area values.

In the image processing device of the aspect to the present invention, the position information acquisition part may quasi-form a plurality of grid points for forming a rectangle on a medium prior to the deformation. The movement state of the grid points before and after deformation is thereby easier to ascertain. At this time, the position information acquisition part more preferably quasi-forms grid points at equal intervals in the up-down and left-right directions on the medium prior to the deformation; specifically, the position information acquisition part quasi-forms a plurality of grid points for forming a quadrangle on the medium prior to the deformation.

In the image processing device of the aspect of the present invention, the area difference computation part may be configured to determine, based on the acquired position information of the grid points, whether the first quadrangle formed by the grid points is maintained from before to after deformation of the medium, and, when the first quadrangle is maintained from before to after deformation of the medium, to omit computation of the area difference by the area difference computation part for the second quadrangle after deformation and to omit division by the dividing part. Through this configuration, processing can be simplified by omitting area computation for a quadrangle that is maintained, i.e., for which the deformation ratio is equal, before and after deformation. Here, to say that a "quadrangle is maintained from before to after deformation" may mean that the shape and size of the quadrangle are the same before and after deformation of the medium, or that the size of the quadrangle is different but the shape thereof is the same before and after deformation. The area difference computation part may also determine that a quadrangle in which there is no variation in the height direction before and after deformation of the medium is a quadrangle that is maintained from before to after deformation of the medium.

In the image processing device of the aspect of the present invention, the correction execution part may be configured to correct the formation amount of the colorant to a greater extent in correspondence with a greater deformation ratio after deformation. More appropriate color correction can thereby be performed.

In the image processing device of the aspect of the present invention, the colorant may be an ink. The colorant may also be a toner.

In the image processing device of the aspect of the present invention, the correction execution part may be configured to compute the deformation ratio of a triangle from the area of the triangle before and after deformation of the medium, and to use the computed deformation ratio to correct the formation amount of the colorant. The deformation ratio can thereby be found relatively easily by using the post-deformation area computed when the area difference is found.

An image processing method according to another aspect of the present invention is a method for processing an image formed using a colorant on a medium that is deformed by molding. The image processing method includes: acquiring position information relating to positions of a plurality of grid points, the grid points being quasi-formed on the medium to form a first quadrangle prior to deformation and subsequently moved in conjunction with deformation of the medium; computing a first area difference which is an area difference of two triangles obtained by dividing a second quadrangle by a first diagonal, the second quadrangle being formed by the grid points after deformation of the medium, and computing a second area difference which is an area difference of two triangles obtained by dividing the second quadrangle by a second diagonal different from the first diagonal; dividing the first quadrangle quasi-formed on the medium prior to deformation, by using one of the first diagonal and the second diagonal that yields a larger area difference when the first area difference and the second area difference are compared; and correcting a formation amount of colorant formed in a region of one of the triangles of the medium according to a deformation ratio after deformation for the one of the triangles formed by dividing the first quadrangle.

In this image processing method, as in the image processing device described above, two diagonals are used to divide the quadrangle into two regions having different deformation ratios after deformation of the medium, a diagonal which produces a large area difference, i.e., a large difference in the deformation ratio, is used to divide the quadrangle, and the formation amount of colorant is corrected for each divided region. Consequently, by using triangular regions formed by diagonals, color correction can be more appropriately performed by simpler processing. In this image processing method, various embodiments of the image processing device described above may be used, and steps which realize the functions of the image processing device described above may also be added.

The program of the present invention is designed to realize the steps of the image processing method described above in one or more computers. The program may be recorded in a non-transitory recording medium (e.g., hard disk, ROM, FD, CD, DVD, or the like) that is readable by computer, or may be delivered from one computer to another computer via a transmission medium (Internet, LAN, or other communication network), or may be transferred by any other method. Insofar as the program is executed by one computer or the steps thereof are executed in distributed fashion by a plurality of computers, the steps of the image processing method described above are executed, and the same operational effects as those of the image processing method are therefore obtained.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
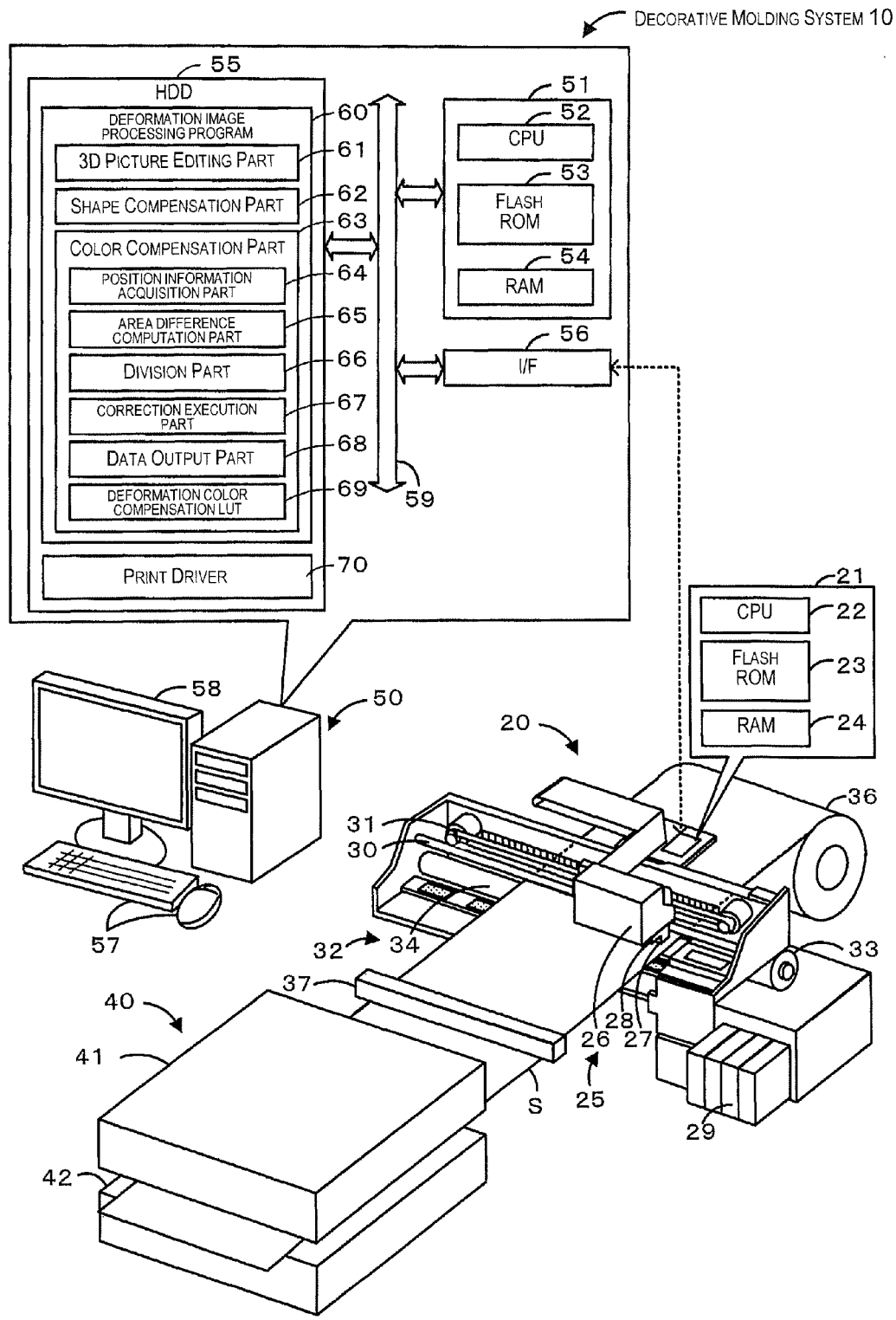
FIG. 1 is a schematic view showing an example of the overall configuration of the decorative molding system 10.

Embodiments of the present invention will next be described using the accompanying drawings. FIG. 1 is a schematic view showing an example of the overall configuration of a decorative molding system 10 as the present embodiment. As shown in FIG. 1, the decorative molding system 10 of the present embodiment is provided with a printer 20 for forming an image by discharging ink onto a medium S that is withdrawn from a roll 36; a molding device 40 for deforming the medium S after image formation and molding the medium S into a solid object; and a personal computer (PC) 50 having the function of an image processing device for outputting printing data, the personal computer (PC) 50 being connected so as to be capable of communicating data to the printer 20. The printer 20 and the personal computer 50 constitute a printing system.

The printer 20 is configured as a printing device capable of executing decorative printing processing for printing on a resin sheet or other medium S (e.g., a polyethylene film or the like). The printer 20 is provided with a controller 21 for controlling the device as a whole; a printing mechanism 25 for discharging ink to the medium S; and a conveyance mechanism 32 for conveying the medium S. The controller 21 is configured as a microprocessor centered around a CPU 22, and is provided with a flash ROM 23 capable of storing various processing programs and rewriting data, a RAM 24 for performing such functions as temporarily storing data and preserving data, and other components. The controller 21 receives the printing data from the PC 50 and controls the printing mechanism 25 or the conveyance mechanism 32 so as to execute printing processing. The printing mechanism 25 is provided with a carriage 26 which is reciprocated left and right (primary scanning direction) along a carriage shaft 30 by a carriage belt 31; a print head 28 for applying pressure to an ink to discharge ink droplets from nozzles 27; and a cartridge 29 for accommodating various colors of ink. The print head 28 is provided below the carriage 26, and discharges each color of ink from the nozzles 27 provided to a bottom surface of the print head 28 by a scheme in which a voltage is applied to a piezoelectric element to cause the piezoelectric element to deform and apply pressure to the ink. The mechanism for applying pressure to the ink may also function by using heat of a heater to form a bubble. The cartridge 29 is mounted on the main body side of the device and separately accommodates colors of ink such as cyan (C), magenta (M), yellow (Y), and black (K), and feeds the accommodated ink to the print head 28 via tubes not shown in the drawing. The conveyance mechanism 32 is driven by a drive motor 33, and is provided with a conveyance roller 34 for conveying the medium S, and other components.

The molding device 40 is a device for molding the medium S into a desired three-dimensional shape after an image has been formed on the medium S by the printer 20. The molding device 40 is provided with a top die part 41 disposed above the medium S and a bottom die part 42 disposed below the medium S. A metal mold not shown in the drawing is set in the top die part 41 or the bottom die part 42, and molds the medium S into a three-dimensional shape by holding the medium S therebetween. The medium S may be molded by hot forming or compression molding.

The PC 50 is a multi-purpose personal computer configured as an image processing device and printing control device used by a user. The PC 50 is provided with a controller 51 for controlling the device as a whole; a high-capacity memory HDD 55 as a storage unit for storing various application programs or various data files; and a network interface (I/F) 56 for performing data input and output with respect to the printer 20 and other external instruments. The controller 51 is provided with a CPU 52 for executing various types of control; a flash ROM 53 for storing various types of control programs; a RAM 54 for temporarily storing data; and other components. The PC 50 is provided with a keyboard, mouse, or other input device 57 for inputting various commands of a user; a display 58 for displaying various types of information; and other components. The PC 50 has the function of executing operations in accordance with the input operation when a user performs an input operation via the input device 57 using a cursor or the like that is displayed on the display 58. The controller 51, HDD 55, I/F 56, input device 57, display 58, and other components are electrically connected by a bus 59 and configured so as to be able to exchange various control signals and data.

Figure 2:
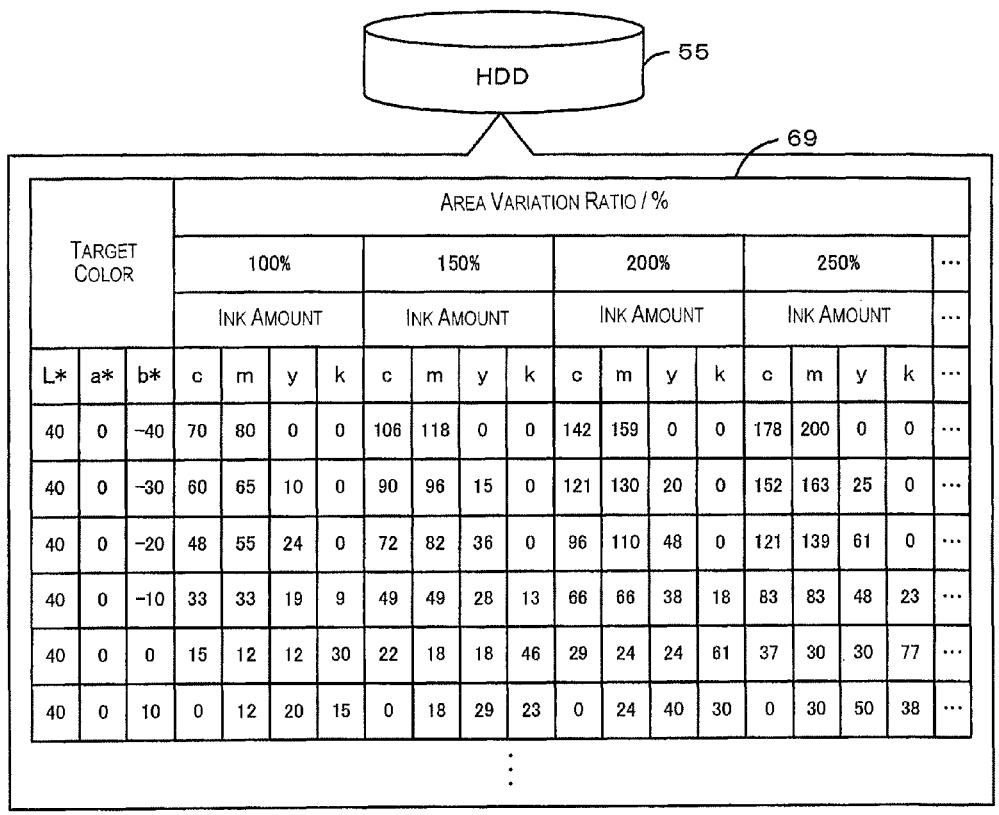
FIG. 2 is a view showing an example of the deformation color compensation LUT 69.

An application program not shown in the drawing, a deformation image processing program 60, a print driver 70, and the like are stored in the HDD 55 of the PC 50. The deformation image processing program 60 is a program used when the image formed on the medium S is corrected for color misalignment or shape misalignment that occurs after molding (after deformation) of the medium S, and the deformation image processing program 60 has a 3D picture editing part 61, a shape compensation part 62, a color compensation part 63, and other parts. The 3D picture editing part 61 has the function of editing the image formed on the medium S before molding, and editing the image formed on the medium S after molding. The shape compensation part 62 has the function of performing shape compensation whereby a shape variation of a design (characters or pattern) on the molded article surface that occurs due to deformation of the external shape during molding of the medium S is corrected to obtain the desired shape. The color compensation part 63 has the function of performing color compensation whereby a variation in hue of the molded article due to deformation during molding of the medium S is corrected to obtain the desired hue. The color compensation part 63 has a position information acquisition part 64, an area difference computation part 65, a division part 66, a correction execution part 67, a data output part 68, a deformation color compensation LUT 69, and other components. The position information acquisition part 64 has the function of acquiring position information relating to the positions of a plurality of grid points, the plurality of grid points forming a plurality of quadrangles and being quasi-formed on the medium S prior to the deformation and subsequently moved in conjunction with the deformation of the medium S. The position information acquisition part 64 has the function of acquiring position information in the form of coordinates (X coordinate, Y coordinate, Z coordinate) to which the grid points are moved after molding (after deformation) of the medium S, the grid points forming quadrangles being quasi-formed on the medium S prior to the deformation. The area difference computation part 65 has the function of computing the area difference of two triangles obtained by dividing a quadrangle by a first diagonal, the quadrangle being formed by grid points after the deformation of the medium S, and computing the area difference of two triangles obtained by dividing the quadrangle by a second diagonal different from the first diagonal, based on the acquired position information. In the area difference computation part 65, the four grid points that form the smallest unit prior to deformation are treated as one unit, and a diagonal is created for grid points that form a quadrangle after deformation. The division part 66 has the function of dividing the quadrangle quasi-formed on the medium S prior to the deformation, by using the diagonal that yields the larger area difference among the first diagonal and the second diagonal. The correction execution part 67 has the function of using the deformation color compensation LUT 69 to correct the formation amount (discharge amount) of colorant (ink) formed on the medium S, according to a deformation ratio after deformation for the triangles formed by division. The data output part 68 has the function of outputting the corrected printing image to the print driver 70. The deformation color compensation LUT 69 is a correlation table in which the relationship between the color value of the desired color for the molded object after deformation of the medium S, the deformation ratio of the medium S, and the amount of ink formed on the medium S is empirically determined. FIG. 2 is a view showing an example of the deformation color compensation LUT 69. In the deformation color compensation LUT 69 shown in FIG. 2, for each specified color value and deformation ratio of the medium S, the amount of ink of each color is derived for achieving the specified color value after the medium S has been deformed by the specified deformation ratio. The established trend in the deformation color compensation LUT 69 is that for the same color value, the formation amount of colorant increases the greater the deformation ratio is after deformation. The deformation color compensation LUT 69 used is one in which data between each stored value are developed into a LUT having more grid point data by a publicly known tetrahedral interpolation processing. FIG. 2 shows only a portion of the deformation color compensation LUT 69. The 3D picture editing part 61, the shape compensation part 62, and the color compensation part 63 are incorporated into the deformation image processing program 60 as a 3D picture editing module program, a shape compensation module program, and a color compensation module program, respectively. The position information acquisition part 64, the area difference computation part 65, the division part 66, the correction execution part 67, and the data output part 68 are incorporated into the color compensation part 63 as a position information acquisition module, an area difference computation module, a division module, a correction execution module, and a data output module, respectively. These modules are executed by the controller 51 to perform each of the functions described above. The print driver 70 is a program for converting a print job received from an application program into print data that can be directly printed by the printer 20, and outputting (transmitting) the print data to the printer 20. The print driver 70 also has the function of outputting the print data created by the deformation image processing program 60 to the printer 20.

Figure 3:
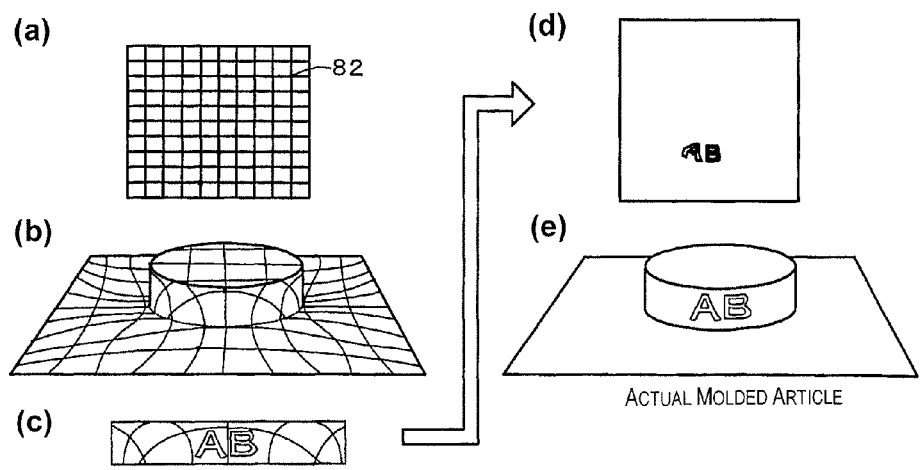
FIG. 3 is a view showing the shape compensation processing of the deformation image processing program 60.

Image processing by the decorative molding system 10 of the present embodiment configured as described above will next be described, beginning with the processing performed by the shape compensation part 62. FIG. 3 is a view showing the shape compensation processing executed by the deformation image processing program 60. As shown in FIG. 3, when the 3D picture editing part 61 and the shape compensation part 62 are activated, the CPU 52 creates an image in which grid points 82 are formed at equal intervals in the vertical and horizontal directions and a grid linking the grid points is formed on a flat medium (FIG. 3(*a*)). Processing is then performed for deforming the medium so as to mold to the shape of a desired product, and the three-dimensional coordinate positions of the grid points 82 after deformation, the distortion directions of the grid, and the distortion amounts are then calculated. Based on the calculation results, a three-dimensional model image of the molded solid object is created and processed for display on the display 58 (FIG. 3(*b*)). A picture is then formed on the surface of the three-dimensional model by a user input operation (FIG. 3(*c*)), and when a two-dimensional conversion instruction is inputted, the coordinate values in three dimensions are converted to coordinate values in two dimensions, and the converted image is displayed (FIG. 3(*d*)). An image having the shape of the desired picture after molding is thus formed on the sheet prior to molding, and block copy image data can be created for printing on the medium S prior to molding. The block copy data are then subjected to the color compensation processing described below.

Figure 4:
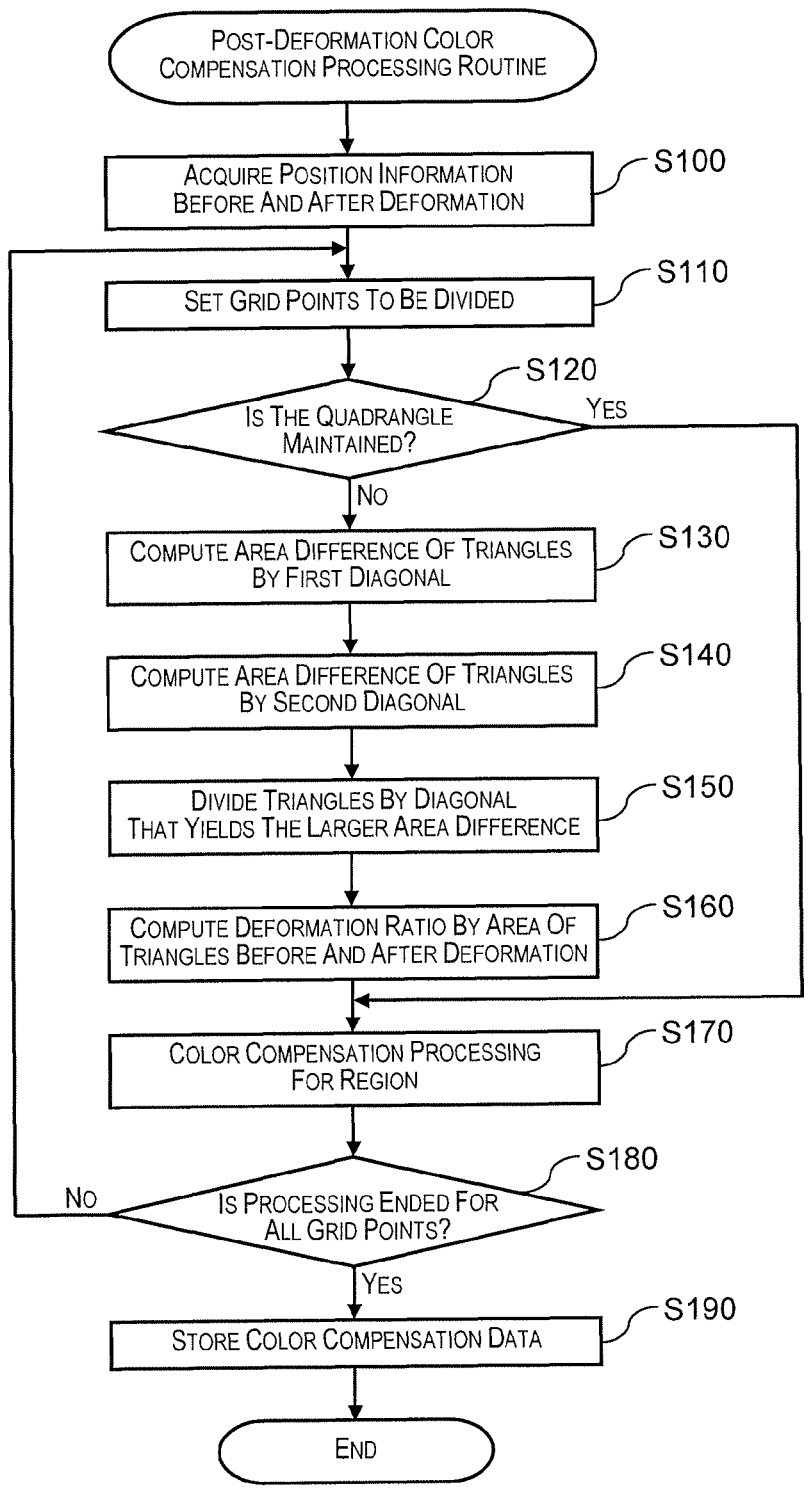
FIG. 4 is a flowchart showing an example of the post-deformation color compensation processing routine.
Figure 5:
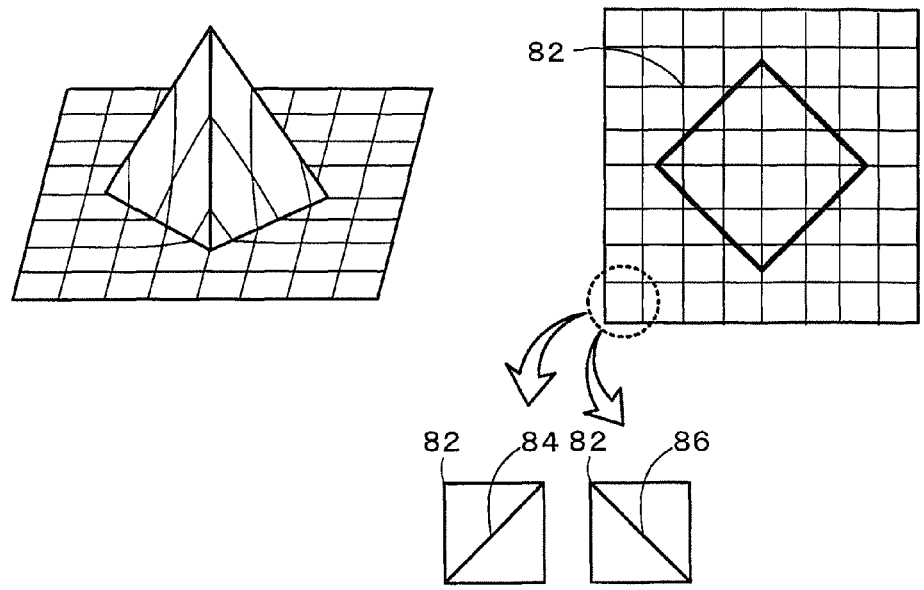
FIG. 5 is a view showing an example of an actual molded article.

The processing of color compensation for the molded article deformed by molding will next be described. FIG. 4 is a flowchart showing an example of the post-deformation color compensation processing routine executed by the CPU 52 of the controller 51. This routine is stored in the HDD 55 and is executed after an execution instruction for color compensation is inputted. The command to execute color compensation may be inputted by, for example, clicking a color compensation execution button that is displayed on a screen after block copy image data for which the abovementioned shape compensation has been performed are selected on an editing screen (not shown in the drawing) of the deformation image processing program 60 displayed on the display 58. This color compensation processing is executed by the functions of the color compensation part 63, such as the position information acquisition part 64, the area difference computation part 65, the division part 66, the correction execution part 67, the data output part 68, and the deformation color compensation LUT 69. In this post-deformation color compensation processing, since the color variation increases in response to an increase in the deformation ratio of the medium S, processing is performed in which the deformation ratio is used as a basis for correcting the amount of ink used during image formation prior to molding. A case of molding a quadrangular pyramid as shown in FIG. 5 will be described as a specific example. FIG. 5 is a view showing an example of an actual molded article.

When this routine is executed, the CPU 52 acquires the position information of the grid points from before and after deformation fabrication (step S100). Here, position information is acquired by acquiring the three-dimensional coordinates (X, Y, Z) of the grid points prior to deformation fabrication, found by the shape compensation processing described above, and acquiring the three-dimensional coordinates (X, Y, Z) of the grid points after deformation fabrication. Here, the image shown in FIG. 5 in which a plurality of grid points 82 is arranged at equal intervals in the up-down and left-right directions of a plane is acquired as the position information prior to the deformation fabrication, and the image of the quadrangular pyramid is acquired as the position information after the deformation fabrication. The CPU 52 then sets the grid points that constitute the quadrangle to be divided, among post-deformation grid points (step S110). The grid points to be divided may be set in order from the four grid points of the quadrangle in the upper left corner to the right, and then from top to bottom, for example. The CPU 52 then determines whether the quadrangle after deformation fabrication has been maintained in what was the rectangular shape thereof prior to the deformation fabrication, based on the three-dimensional coordinates of the grid points (step S120). A rectangle can be determined to have been maintained from before to after the deformation when the shape and size of the quadrangle are the same before and after deformation of the medium, when the size of the quadrangle is different but the shape thereof is the same, when the height direction Z has the same value for all the three-dimensional coordinates of the grid points, or when the sides of the quadrangle all have the same length.

Figure 6:
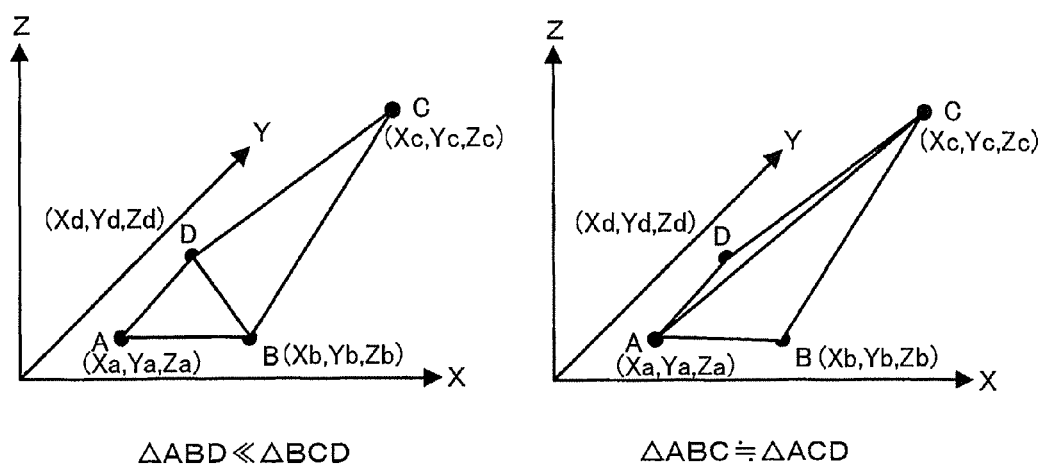
FIG. 6 is a view showing an example of the processing for setting a diagonal

When the quadrangle is not maintained as a rectangle from before to after the deformation fabrication, a deformation is assumed to have occurred in a region of the quadrangle, and the processing of steps S130 through S150 for dividing the rectangular region by a diagonal is executed. For example, in the case that the quadrangle is deformed, it is possible that there is a region with a high deformation ratio and a region with a low deformation ratio in the quadrangle. Here, processing is performed for dividing regions of different deformation ratios by a simple process using a diagonal. Specifically, after deformation fabrication, the area difference of two triangles obtained by dividing the region of the quadrangle by a first diagonal is computed (step S130), and the area difference of two triangles obtained by dividing the region of the quadrangle by a second diagonal different from the first diagonal is computed (step S140). The area difference is computed by subtracting the smaller area value from the larger area value of the two area values. For example, as shown in FIG. 5, the diagonal that connects the upper right grid point 82 and the lower left grid point 82 may be set as the first diagonal 84, and the diagonal that connects the upper left grid point 82 and the lower right grid point 82 may be set as the second diagonal 86. Consequently, using the diagonal that yields the greater area difference among the two diagonals, division processing is executed for the pre-deformation rectangular region that corresponds to a set post-deformation quadrangle (step S150). FIG. 6 is a view showing an example of the processing for setting the diagonals. As shown in FIG. 6, the quadrangle formed by the four grid points A, B, C, D can be divided by the diagonal BD (left side of FIG. 6) or the diagonal AC (right side of FIG. 6). For example, in a case in which only one grid point is in a distant position (point C), or the region of the quadrangle is otherwise deformed in an irregular fashion, an area size difference occurs in the division of the quadrangle by a diagonal. In FIG. 6, the area difference is larger when the quadrangle is divided by the diagonal BD than when the quadrangle is divided by the diagonal AC. Here, the reason for the larger area difference between the divided triangles may be that the deformation ratios of the divided regions differ by a larger amount. The area difference of the triangles formed by the diagonal is thus utilized to divide the pre-deformation rectangle into regions having different deformation ratios.

The CPU 52 then uses the area values of the triangles from before and after deformation fabrication to compute the deformation ratio (%) of each triangle after division (step S160), and after step S160, or when a rectangle is maintained from before to after deformation fabrication in step S120, color compensation processing is executed for the pre-deformation rectangular region that corresponds to the set post-deformation quadrangle (step S170). Here, color compensation processing is executed for each triangle of the rectangular region divided by the diagonal. In the case that a plurality of colors is present in a region, color compensation processing is executed for each color. In the color compensation processing, processing is performed for setting the ink amount for each color used in the region, according to the desired color value and deformation ratio and using the deformation color compensation LUT 69. In the color compensation processing, in such cases as when the desired color value and deformation ratio are between values stored in the deformation color compensation LUT 69, the appropriate ink amount is approximated by calculation by a publicly known tetrahedral interpolation processing. In this color compensation processing, when color values are the same according to the deformation color compensation LUT 69, the formation amount of ink is corrected so as to be greater the larger the deformation ratio is after deformation. When the rectangle is maintained from before to after deformation fabrication in step S120, since there is no variation in the deformation ratio from before to after deformation fabrication, the processing for dividing the rectangular region using a diagonal can be omitted.

Figure 7:
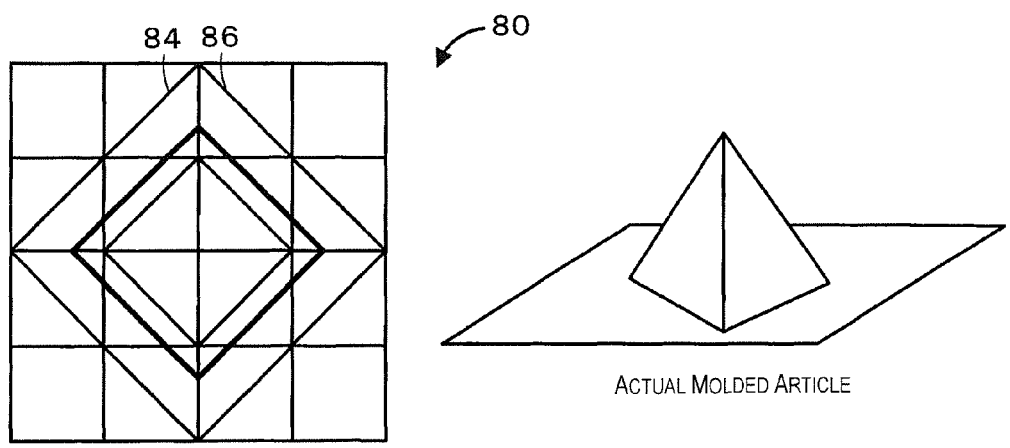
FIG. 7 is a view showing the block copy data 80.

The CPU 52 then determines whether processing is ended for all the grid points (step S180), and when processing is not ended for all grid points, the CPU 52 repeats the processing of step S110 and subsequent steps. When processing is ended for all the grid points, the CPU 52 stores the color compensation data in the HDD 55 (step S100) and ends this routine. FIG. 7 is a view showing the block copy data 80 that are created by the color compensation processing described above. FIG. 7 shows a state in which the grid count is reduced. As shown in FIG. 7, the rectangle divided by the first diagonal 84 and the rectangle divided by the second diagonal 86 are set according to the area difference, and color correction is executed according to the deformation ratio of each triangle. For example, although ideal color reproduction can be achieved by increasing the grid count, the processing time becomes extremely long. Processing time can be shortened by reducing the grid count, but color variation is coarsened and ideal color is difficult to obtain. Here, a rectangular grid and diagonals are used to keep the processing time from increasing and to realize more ideal color correction.

The correspondence between the constituent elements of the present embodiment and the constituent elements of the present invention is clarified herein. The controller 51 and position information acquisition part 64 correspond to the position information acquisition part in the present embodiment, the controller 51 and area difference computation part 65 correspond to the area difference computation part in the present embodiment, the controller 51 and division part 66 correspond to the division part in the present embodiment, and the controller 51 and correction execution part 67 correspond to the correction execution part in the present embodiment. In the present embodiment, the description of the operation of the PC 50 also clarifies an example of the image processing method of the present invention.

By the PC 50 of the present embodiment described in detail above, a plurality of grid points for forming a plurality of squares is quasi-formed on a medium prior to deformation, after which position information is acquired that relates to the positions of the grid points moved in conjunction with deformation of the medium, the area difference of two triangles divided by a first diagonal is computed in a quadrangle formed by the grid points after deformation of the medium, and the area difference of two triangles divided by a second diagonal different from the first diagonal is computed in the quadrangle. The quadrangle quasi-formed on the medium prior to deformation is divided using the diagonal that yields the larger area difference among the first diagonal and the second diagonal, and the formation amount of colorant formed on the medium is corrected according to the deformation ratio after deformation for the triangles formed by the division. The grid points in the quadrangle formed by the grid points of the medium after deformation are in a three-dimensional positional relationship, and regions having different deformation ratios are sometimes included in the region of the quadrangle. Here, two diagonals are used to divide the quadrangle into two regions having different deformation ratios after deformation of the medium, a diagonal which produces a large area difference, i.e., a large difference in the deformation ratio, is used to divide the quadrangle, and the formation amount of colorant is corrected for each divided region. Consequently, by using triangular regions formed by diagonals, color correction can be more appropriately performed by simpler processing. Since grid points forming a square are quasi-formed on the medium prior to deformation, the movement state of the grid points from before to after deformation is more easily assessed.

When a quadrangle is maintained from before to after deformation of the medium, since area difference computation is omitted and division processing is omitted, area computation is omitted for quadrangles in which the deformation ratio is equal, and processing can thereby be simplified. Since the formation amount of colorant is corrected more the greater the deformation ratio is after deformation, more appropriate color correction can be performed. Furthermore, since the deformation color compensation LUT 69 is used for correlation, color correction can be performed easily relative to calculation based on a correlation scheme, for example. Since a deformation ratio of triangles is computed from the area of the triangles before and after deformation of the medium S, and the ink amount is corrected using the computed deformation ratio, the deformation ratio can be found relatively easily by using the post-deformation area computed when the area difference is found.

The present invention is not limited by the embodiment described above, and can be implemented in various ways within the technical scope of the present invention.

Figure 8:
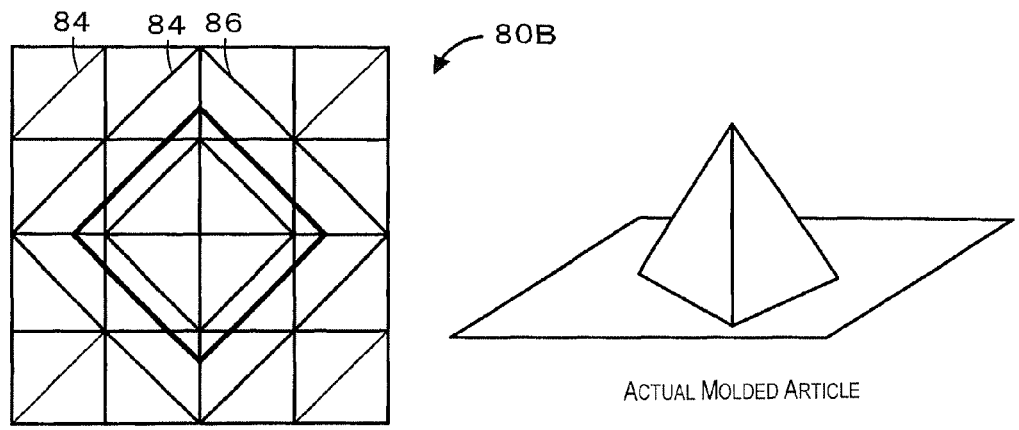
FIG. 8 is a view showing an example of another set of block copy data 80B.

For example, in the embodiment described above, diagonal setting and division processing are not performed for quadrangles that are maintained from before to after deformation fabrication, but the present invention is not limited to this particular configuration, and diagonal setting and division processing may also be performed for all quadrangles. FIG. 8 is a view showing an example of another set of block copy data 80B. As shown in FIG. 8, a configuration may be adopted in which, for example, the first diagonal 84 is set as an initial value, and the first diagonal 84 is used to divide the quadrangle when there is no area difference in the quadrangle regardless of whether the first diagonal 84 or the second diagonal 86 is used. The second diagonal 86 may alternatively be used. In this case as well, color correction can be performed more appropriately and by simpler processing using diagonals for quadrangles in which there is an area difference.

In the embodiment described above, grid points quasi-formed on the medium S prior to deformation fabrication are uniformly arranged to form a square grid, but the present invention not limited to this particular configuration, and the grid points may have a rectangular arrangement or be arranged in staggered fashion or in positions somewhat offset from square or rectangular. A rectangular shape is preferred, and a square shape is more preferred for assessing the positional relationship of the grid points before and after deformation fabrication.

In the embodiment described above, the three-dimensional shape after molding, i.e., the three-dimensional coordinates (position information) of the grid points 82, is acquired by a software program using the 3D picture editing part 61 or the shape compensation part 62, but the present invention is not limited to this particular configuration, and a configuration may be adopted in which the three-dimensional coordinates of the grid points are acquired by actually fabricating a molded article by deforming a medium S on which a grid is formed, and measuring the molded article. In this case, the shape compensation processing can be performed by a procedure such as the following. For example, a grid is formed on a medium S of the same material as the desired product, and the positions of the grid points are recorded as two-dimensional coordinates. The medium S is then molded by the molding device 40 under the conditions for manufacturing the desired product. The positions of the grid points on the molded (deformed) medium S are measured, and the positions of the grid points are recorded as three-dimensional coordinates. The coordinates before and after deformation fabrication can then be correlated to obtain position information. The position information may be acquired at this time by inputting the three-dimensional coordinates of the measured grid points through use of the input device 57.

In the embodiment described above, color compensation is performed by an ink correction amount that increases the larger the deformation ratio is, but the present invention is not limited to this particular configuration. Correction for color compensation is also performed using the deformation color compensation LUT 69 in the embodiment described above, but the present invention is not limited to this particular configuration, and the formation amount of colorant may also be computed by calculation using a correlation scheme for color value, deformation ratio, and colorant formation amount.

The colorant is an ink in the embodiment described above, but the colorant is not limited to ink in particular insofar as the colorant is capable of imparting color to an image formed on the medium S. For example, the colorant may be a liquid other than ink, a liquid body (liquid dispersion) in which grains of a functional material are dispersed, a fluid such as a gel, toner or other particles, or the like.

In the embodiment described above, the deformation ratio of triangles is computed from the areas of the triangles before and after deformation of the medium, but the present invention is not limited to this particular configuration insofar as a deformation ratio of triangles is found.

In the embodiment described above, the printer 20 is provided with an inkjet-type printing mechanism 25 for discharging ink, but the present invention is not limited to this particular configuration, and a laser printer, a heat-transfer printer, or a dot impact printer may also be used. An image processing device such as the PC 50 is also used, but the present invention may be implemented as an image processing method or as a program capable of executing the image processing method.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image processing device for processing an image formed using a colorant on a medium that is deformed by molding, the image processing device comprising:
    a position information acquisition part configured to acquire position information relating to positions of a plurality of grid points, the grid points being quasi-formed on the medium to form a first quadrangle prior to deformation and subsequently moved in conjunction with deformation of the medium;

an area difference computation part configured to compute a first area difference which is an area difference of two triangles obtained by dividing a second quadrangle by a first diagonal, the second quadrangle being formed by the grid points after deformation of the medium, and to compute a second area difference which is an area difference of two triangles obtained by dividing the second quadrangle by a second diagonal different from the first diagonal;

a dividing part configured to divide the first quadrangle quasi-formed on the medium prior to deformation by using one of the first diagonal and the second diagonal that yields a larger area difference when the first area difference and the second area difference are compared; and a correction execution part configured to correct a formation amount of colorant formed in a region of each of the triangles of the medium according to a deformation ratio after deformation for each of the triangles formed by dividing the first quadrangle.

2. The image processing device according to claim 1, wherein
the area difference computation part is configured to determine, based on the acquired position information of the grid points, whether the first quadrangle formed by the grid points is maintained from before to after deformation of the medium, and, when the first quadrangle is maintained from before to after deformation of the medium, to omit computation of the area difference by the area difference computation part for the second quadrangle after deformation and to omit division by the dividing part.

3. The image processing device according to claim 1, wherein
the correction execution part is configured to correct the formation amount of the colorant to a greater extent in correspondence with a greater deformation ratio after deformation.

4. The image processing device according to claim 1, wherein
the colorant is an ink.

5. The image processing device according to claim 1, wherein
the correction execution part is configured to compute the deformation ratio of a triangle from the area of the triangle before and after deformation of the medium, and to use the computed deformation ratio to correct the formation amount of the colorant.

6. An image processing method for processing an image formed using a colorant on a medium that is deformed by molding, the image processing method comprising:
acquiring position information relating to positions of a plurality of grid points, the grid points being quasi-formed on the medium to form a first quadrangle prior to deformation and subsequently moved in conjunction with deformation of the medium;

computing a first area difference which is an area difference of two triangles obtained by dividing a second quadrangle by a first diagonal, the second quadrangle being formed by the grid points after deformation of the medium, and computing a second area difference which is an area difference of two triangles obtained by dividing the second quadrangle by a second diagonal different from the first diagonal;

dividing the first quadrangle quasi-formed on the medium prior to deformation, by using one of the first diagonal and the second diagonal that yields a larger area difference when the first area difference and the second area difference are compared; and correcting a formation amount of colorant formed in a region of one of the triangles of the medium according to a deformation ratio after deformation for the one of the triangles formed by dividing the first quadrangle.

7. The image processing method according to claim 6, further comprising
determining based on the acquired position information of the grid points whether the first quadrangle formed by the grid points is maintained from before to after deformation of the medium,
the computing of the first and second area differences being omitted when the first quadrangle is maintained from before to after deformation of the medium.

8. The image processing method according to claim 6, wherein
the correcting of the formation amount includes correcting the formation amount of the colorant to a greater extent in correspondence with a greater deformation ratio after the deformation.

9. The image processing method according to claim 6, wherein
the colorant is an ink.

10. The image processing method according to claim 6, wherein
the correcting of the formation amount includes computing the deformation ratio of a triangle from the area of the triangle before and after the deformation of the medium, and using the computed deformation ratio to compute the formation amount of the colorant.

11. A non-transitory computer usable medium storing a computer program for causing one or more computers to execute steps of the image processing method according to claim 6.

12. A printing system comprising:
a personal computer provided with a memory unit including the non-transitory computer usable medium according to claim 11; and
a printer configured to print the image based on printing data outputted from the personal computer.

* * * * *